US009609505B2

(12) United States Patent
Ma et al.

(10) Patent No.: US 9,609,505 B2
(45) Date of Patent: Mar. 28, 2017

(54) METHOD AND APPARATUS FOR PROCESSING UNSTRUCTURED SUPPLEMENTARY SERVICE DATA SERVICE

(71) Applicant: Huawei Technologies Co., Ltd., Shenzhen, Guangdong (CN)

(72) Inventors: Hongwei Ma, Chengdu (CN); Haiyang Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 14/731,757

(22) Filed: Jun. 5, 2015

(65) Prior Publication Data

US 2015/0271659 A1 Sep. 24, 2015

Related U.S. Application Data

(63) Continuation of application No. PCT/CN2013/081083, filed on Aug. 8, 2013.

(30) Foreign Application Priority Data

Dec. 7, 2012 (CN) .......................... 2012 1 0524156

(51) Int. Cl.
*H04W 8/10* (2009.01)
*H04W 4/14* (2009.01)
(Continued)

(52) U.S. Cl.
CPC ........... *H04W 8/10* (2013.01); *H04L 65/1016* (2013.01); *H04L 65/1069* (2013.01); *H04W 4/14* (2013.01); *H04W 8/24* (2013.01); *H04W 84/042* (2013.01)

(58) Field of Classification Search
CPC ....................................................... H04W 8/10
See application file for complete search history.

(56) References Cited

U.S. PATENT DOCUMENTS

2008/0186921 A1 8/2008 Long et al.
2009/0245180 A1 10/2009 Wu
(Continued)

FOREIGN PATENT DOCUMENTS

CN 101252702 A 8/2008
CN 101505463 A 8/2009
(Continued)

OTHER PUBLICATIONS

"3rd Generation Partnership Project; Technical Specification Group Core Network and Terminals; Unstructured Supplementary Service Data (USSD) using IP Multimedia (IM) Core Network (CN) subsystem IMS; Stage 3 (Release 11)", 3GPP TS 24.390 V11.0.0, Sep. 2012, 27 pages.
(Continued)

*Primary Examiner* — John Blanton

(57) ABSTRACT

The present invention discloses a method for processing USSD service. In this method, when an application server determines that a mobile terminal on a VoLTE network supports USSD operations over IMS, the application server sends an invite message to the mobile terminal, where the invite message includes an identifier of a USSD service; receives an invite response from the mobile terminal, where the invite response carries reply information entered by a subscriber and the identifier of the USSD service; generates, according to the reply information, a message that requests to execute the USSD service, where the message that requests to execute the USSD service carries the identifier of the USSD service; and sends, to a subscriber data server, the message that requests to execute the USSD service, so that the subscriber data server processes the USSD service.

12 Claims, 8 Drawing Sheets

(51) Int. Cl.
*H04L 29/06* (2006.01)
*H04W 8/24* (2009.01)
*H04W 84/04* (2009.01)

(56) References Cited

U.S. PATENT DOCUMENTS

2010/0190485 A1    7/2010  Engelhart, Sr.
2010/0257280 A1*  10/2010  Stokking ................ H04L 65/80
                                         709/231

FOREIGN PATENT DOCUMENTS

| CN | 102984678 A | 3/2013 |
|---|---|---|
| EP | 1 662 831 A1 | 5/2006 |
| RU | 2434363 C2 | 11/2011 |
| RU | 2446624 C2 | 3/2012 |
| WO | WO 2008/055913 A1 | 5/2008 |

OTHER PUBLICATIONS

"Unstructured Supplementary Service Data (USSD)", 3rd Generation Partnership Project 2 "3GPP2", Apr. 2012, 62 pages.

* cited by examiner

METHOD AND APPARATUS FOR PROCESSING UNSTRUCTURED SUPPLEMENTARY SERVICE DATA SERVICE

CROSS-REFERENCE TO RELATED APPLICATIONS

This application is a continuation of International Application No. PCT/CN2013/081083, filed on Aug. 8, 2013, which claims priority to Chinese Patent Application No. 201210524156.0, filed on Dec. 7, 2012, both of which are hereby incorporated by reference in their entireties.

TECHNICAL FIELD

The present invention relates to the field of communications technologies, and in particular, to a method and apparatus for processing unstructured supplementary service data (USSD) service.

BACKGROUND

Unstructured supplementary service data (Unstructured Supplementary Service Data, USSD for short) service is a newly emerging, real-time interactive session data service based on a Global System for Mobile Communications (Global System for Mobile Communications, GSM for short) network. For a subscriber identity module (Subscriber Identity Module, SIM for short) card, the USSD service transfers data by using a signaling path on a GSM network and is a new service based on a technology of a short message service system in GSM.

The third generation partnership project (The 3rd Generation Partnership Project, 3GPP for short) standards body has already defined the use of USSD service in legacy second generation (second generation, 2G for short)/third generation (3rd Generation, 3G for short) mobile communications networks, including: USSD service initiated from a mobile terminal side to a network side, and USSD service initiated from a network side to a mobile terminal side.

For example, by entering an unstructured supplementary service operation command in USSD format on a mobile terminal, a subscriber initiates a specific service request to a network side to complete a specific service. The specific services, such as inquiring flight status, train running status, ship time schedule, or weather on a mobile terminal, are all completed by initiating a USSD service request.

While communications networks are evolving from 2G/3G to Long Term Evolution (Long Term Evolution, LTE for short) of 4G, a bearer network used for carrying mobile voice data is also shifting from a traditional switch network and a softswitch network to a voice over LTE (Voice over LTE, VoLTE for short) network. For the VoLTE network, the 3GPP standards body has defined a standard for initiating a USSD service from a mobile terminal side to a network side, but does not yet define a standard for initiating a USSD service from a network side to a mobile terminal side; what's worse, the standards for network-initiated USSD service on legacy 2G/3G networks are not applicable to mobile terminals on the VoLTE network. This compromises the application scope of the prior art, and also hinders the use of VoLTE networking.

SUMMARY

Objectives of the present invention are to provide a method and apparatus for processing USSD service, to solve a problem in which a USSD service cannot be initiated from an existing network side to a mobile terminal on a VoLTE network.

According to a first aspect, the present invention provides a method for processing unstructured supplementary service data (USSD) service, and the method includes:

when an application server determines that a mobile terminal on a voice over Long Term Evolution network supports USSD operations over IP multimedia core network subsystem, sending, by the application server, an invite message to the mobile terminal through a call session control function (CSCF) entity, where the invite message includes an identifier of a USSD service;

receiving an invite response, where the invite response is sent by the mobile terminal through the CSCF entity and carries reply information entered by a subscriber, and the reply information includes the identifier of the USSD service;

generating, according to the reply information, a message that requests to execute the USSD service, where the message that requests to execute the USSD service carries the identifier of the USSD service; and sending, to a subscriber data server, the message that requests to execute the USSD service, so that the subscriber data server processes the USSD service according to the identifier of the USSD service carried in the message that requests to execute the USSD service.

In a first possible implementation, before the application server determines that the mobile terminal supports USSD operations over IP multimedia core network subsystem, the method further includes:

receiving a USSD service message sent by the subscriber data server, where the USSD service message carries identification information of the mobile terminal and the identifier of the USSD service;

determining an access network of the mobile terminal according to the identification information of the mobile terminal; and if the access network of the mobile terminal is the voice over Long Term Evolution network, determining whether the mobile terminal supports USSD operations over IP multimedia core network subsystem.

With reference to the first aspect or the first possible implementation of the first aspect, in a second possible implementation, the subscriber data server includes a home subscriber server, a home location register, or a USSD center.

With reference to the first aspect or the first or second possible implementation of the first aspect, in a third possible implementation, when the subscriber data server is a USSD center, the receiving a USSD service message sent by the subscriber data server includes:

receiving, through a home subscriber server or a home location register, the USSD service message sent by the USSD center; and the sending, to the subscriber data server, the message that requests to execute the USSD service includes:

sending, to the USSD center through the home subscriber server or the home location register, the message that requests to execute the USSD service.

With reference to the first aspect or the first or second possible implementation of the first aspect, in a fourth possible implementation, when the subscriber data server is a home subscriber server or a home location register, before the receiving a USSD service message sent by the subscriber data server, the method further includes:

receiving a first register message, where the first register message is sent by the mobile terminal through the CSCF entity and carries the identification information and indication information of the mobile terminal, and the indication information is used for indicating whether the mobile terminal supports USSD operations over IP multimedia core network subsystem;

determining, according to the indication information, whether the mobile terminal supports USSD operations over IP multimedia core network subsystem;

generating a second register message when the mobile terminal supports USSD operations over IP multimedia core network subsystem, where the second register message carries address information of the application server and the identification information of the mobile terminal;

sending the second register message to the subscriber data server, so that the subscriber data server records a correspondence between the address information and an identifier of the mobile terminal; and receiving a registration success message sent by the subscriber data server.

According to a second aspect, the present invention provides a method for processing USSD service, and the method includes:

receiving, by a mobile terminal on a voice over Long Term Evolution network through a call session control function (CSCF) entity, an invite message sent by an application server, where the invite message includes an identifier of a USSD service; and sending an invite response to the application server according to the identifier of the USSD service through the CSCF entity, where the invite response carries reply information entered by a subscriber, and the reply information includes the identifier of the USSD service, so that the application server generates, according to the reply information, a message that requests to execute the USSD service and sends, to a subscriber data server, the message that requests to execute the USSD service, where the message that requests to execute the USSD service carries the identifier of the USSD service, and the message that requests to execute the USSD service is used for instructing the subscriber data server to process the USSD service.

In a first possible implementation, before the mobile terminal receives, through the CSCF entity, the invite message sent by the application server, the method further includes:

sending a first register message to the application server through the CSCF entity, where the first register message carries identification information and indication information of the mobile terminal, and the indication information is used for indicating whether the mobile terminal supports USSD operations over IP multimedia core network subsystem, so that the application server generates a second register message when determining, according to the indication information, that the mobile terminal supports USSD operations over IP multimedia core network subsystem, where the second register message carries address information of the application server and an identifier of the mobile terminal, and sends the second register message to the subscriber data server, so that the subscriber data server records a correspondence between the address information and the identifier of the mobile terminal according to the second register message.

With reference to the second aspect or the first possible implementation manner of the second aspect, in a second possible implementation manner, the subscriber data server includes a home subscriber server, a home location register, or a USSD center.

According to a third aspect, the present invention provides an apparatus for processing USSD service, and the apparatus includes:

a sending unit, configured to: when it is determined that a mobile terminal on a voice over Long Term Evolution network supports USSD operations over IP multimedia core network subsystem, send an invite message to the mobile terminal through a call session control function (CSCF) entity, where the invite message includes an identifier of a USSD service;

a receiving unit, configured to receive an invite response, where the invite response is sent by the mobile terminal through the CSCF entity and carries reply information entered by a subscriber, and the reply information includes the identifier of the USSD service; and a generating unit, configured to generate, according to the reply information received by the receiving unit, a message that requests to execute the USSD service, where the message that requests to execute the USSD service carries the identifier of the USSD service;

where the sending unit is further configured to send, to a subscriber data server, the message that requests to execute the USSD service and is generated by the generating unit, so that the subscriber data server processes the USSD service according to the identifier of the USSD service carried in the message that requests to execute the USSD service.

In a first possible implementation, the receiving unit is further configured to receive a USSD service message sent by the subscriber data server, where the USSD service message carries identification information of the mobile terminal and the identifier of the USSD service; and the apparatus further includes: a determining unit, configured to determine an access network of the mobile terminal according to the identification information of the mobile terminal; and an executing unit, configured to: if the access network of the mobile terminal is the voice over Long Term Evolution network, determine whether the mobile terminal supports USSD operations over IP multimedia core network subsystem.

With reference to the third aspect or the first possible implementation of the third aspect, in a second possible implementation, the subscriber data server includes a home subscriber server, a home location register HLR, or a USSD center.

With reference to the third aspect or the first or second possible implementation of the third aspect, in a third possible implementation, when the subscriber data server is the USSD center, the receiving unit is specifically configured to:

receive, through a home subscriber server or a home location register, the USSD service message sent by the USSD center; and the sending unit is specifically configured to send, to the USSD center through the home subscriber server or the home location register, the message that requests to execute the USSD service.

With reference to the third aspect or the first or second possible implementation of the third aspect, in a fourth possible implementation, when the subscriber data server is a home subscriber server or a home location register, the receiving unit is further configured to receive a first register message, where the first register message is sent by the mobile terminal through the CSCF entity and carries the identification information and indication information of the mobile terminal, and the indication information is used for indicating whether the mobile terminal supports USSD operations over IP multimedia core network subsystem;

the executing unit is further configured to determine, according to the indication information received by the receiving unit, whether the mobile terminal supports USSD operations over IP multimedia core network subsystem;

the generating unit is further configured to generate a second register message when the executing unit determines that the mobile terminal supports USSD operations over IMS, where the second register message carries address information of the application server and the identification information of the mobile terminal;

the sending unit is further configured to send, to the subscriber data server, the second register message generated by the generating unit, so that the subscriber data server records a correspondence between the address information and an identifier of the mobile terminal; and the receiving unit is further configured to receive a registration success message sent by the subscriber data server.

According to a fourth aspect, the present invention provides an apparatus for processing USSD service, the apparatus is located on a voice over Long Term Evolution network, and the apparatus includes:

a receiving unit, configured to receive, through a CSCF entity, an invite message sent by an application server, where the invite message includes an identifier of a USSD service; and a sending unit, configured to: send, through the CSCF entity, an invite response to the application server according to the identifier of the USSD service that is included in the invite message received by the receiving unit, where the invite response carries reply information entered by a subscriber, so that the application server generates, according to the reply information, a message that requests to execute the USSD service and sends, to a subscriber data server, the message that requests to execute the USSD service, where the message that requests to execute the USSD service carries the identifier of the USSD service, and the message that requests to execute the USSD service is used for instructing the subscriber data server to process the USSD service.

In a first possible implementation, the sending unit is further configured to: send a first register message to the application server through the CSCF entity, where the first register message carries identification information and indication information of the mobile terminal, and the indication information is used for indicating whether the mobile terminal supports USSD operations over IP multimedia core network subsystem, so that the application server generates a second register message when determining, according to the indication information, that the mobile terminal supports USSD operations over IP multimedia core network subsystem IMS, where the second register message carries address information of the application server and an identifier of the mobile terminal, and sends the second register message to the subscriber data server, so that the subscriber data server records a correspondence between the address information and the identifier of the mobile terminal according to the second register message.

With reference to the fourth aspect or the first possible implementation of the fourth aspect, in a second possible implementation, the subscriber data server includes a home subscriber server, a home location register, or a USSD center.

The method and apparatus for processing unstructured supplementary service data (USSD) service according to the embodiments of the present invention are used so that when a mobile terminal on a VoLTE network supports USSD operations over IMS, an application server sends, a message carrying a USSD service to the mobile terminal, and sends a message carrying reply information to a subscriber data server, so that the subscriber data server processes the USSD service according to the message carrying the reply information. This eliminates the limitation in the prior art due to absence of standards defining initiation of a USSD service from a network side to a mobile terminal on a VoLTE network.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
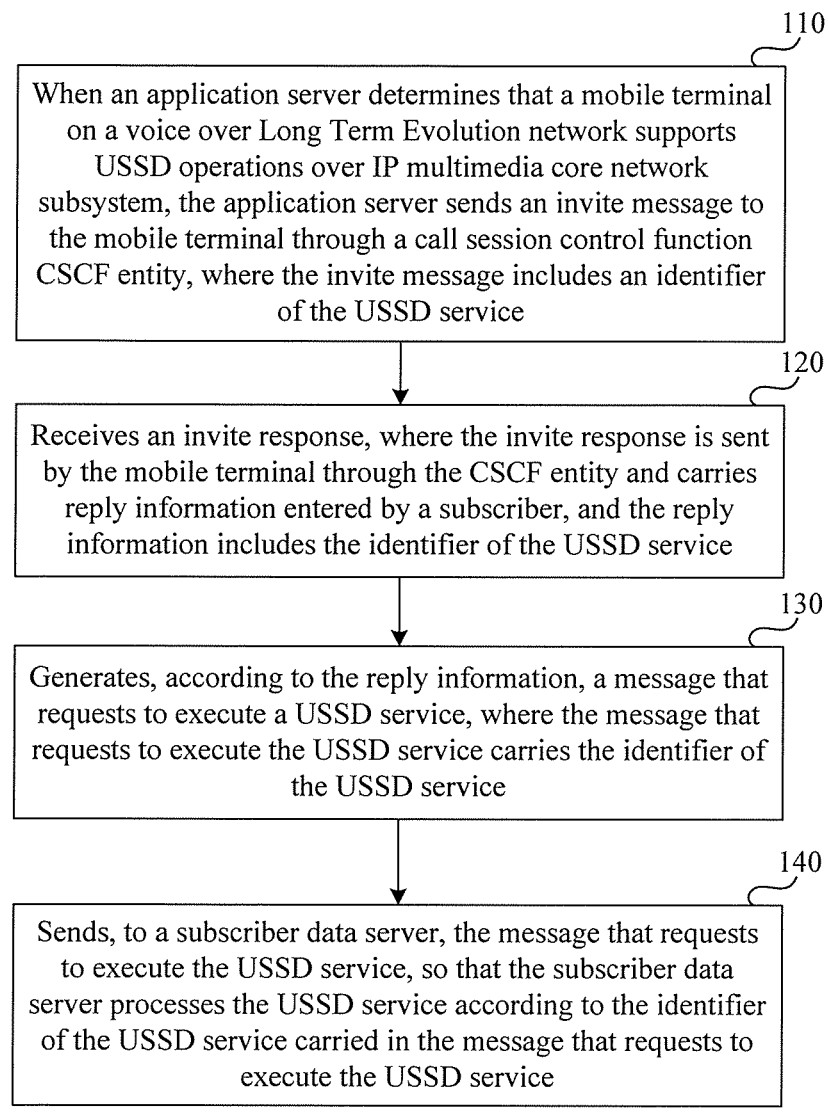
FIG. 1 is a flowchart of a method for processing USSD service according to Embodiment 1 of the present invention.
Figure 2:
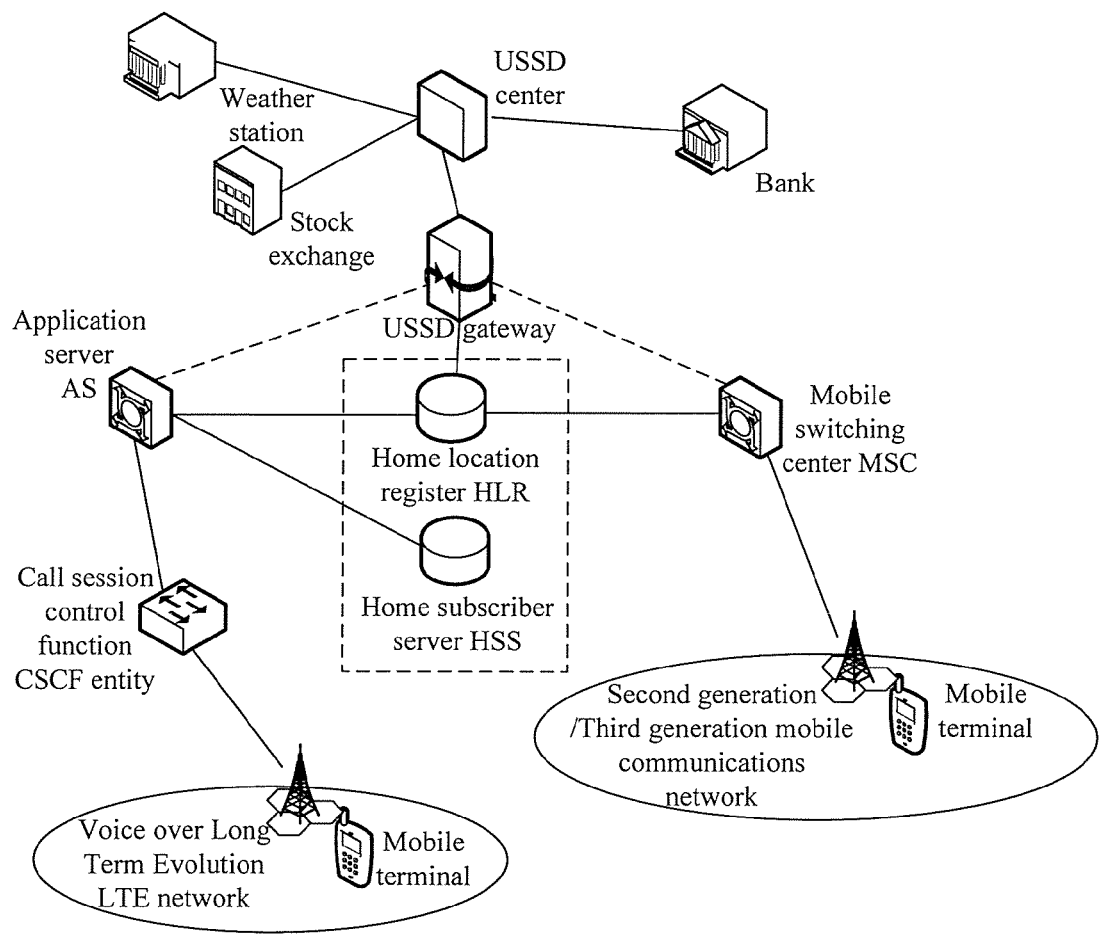
FIG. 2 is a diagram of a system for processing USSD service according to an embodiment of the present invention.

With reference to FIG. 2, the following uses FIG. 1 as an example to describe a method for processing USSD service according to an embodiment of the present invention. FIG. 1 is a flowchart of a method for processing USSD service according to Embodiment 1 of the present invention, and FIG. 2 is a diagram of a system for processing USSD service according to an embodiment of the present invention. The embodiment shown in FIG. 1 is executed by an application server (Application Server, AS for short). As shown in FIG. 1, this embodiment includes the following steps:

Step 110: When an application server determines that a mobile terminal on a VoLTE network supports USSD operations over IP multimedia core network subsystem (IP Multimedia Subsystem, IMS for short), the application server sends an invite message to the mobile terminal through a call session control function entity, where the invite message includes an identifier of the USSD service.

Specifically, as shown in FIG. 2, the mobile terminal on the left side of the drawing is a mobile terminal on a VoLTE network, and the mobile terminal on the right side of the drawing is a mobile terminal on a legacy 2G/3G network. The diagram of the system for processing USSD service according to FIG. 2 is used for practicing the method for processing the USSD service in the embodiments of the present invention.

A USSD gateway is connected to the VoLTE network and the legacy 2G/3G network by using the Mobile Application Part (Mobile Application Part, MAP for short) protocol of Signaling System No. 7, and the USSD gateway is connected to a USSD center by using a network communications protocol (TCP/IP) protocol. In an actual networking scenario, the USSD gateway is generally built into the USSD center.

On the VoLTE network, communication between the mobile terminal and the application server is completed by using the Session Initiation Protocol (Session Initiation Protocol, SIP for short); and on the legacy 2G/3G network, communication between the mobile terminal and a mobile switching center (Mobile Switching Center, MSC for short) is completed by using the MAP Protocol.

Before the application server determines that the mobile terminal supports USSD operations over IMS, the application server receives a USSD service message sent by a subscriber data server, where the USSD service message carries identification information of the mobile terminal and the identifier of the USSD service; and the application server determines an access network of the mobile terminal according to the identification information of the mobile terminal, where domain selection by the application server is in accordance with the prior art, and no detail is repeatedly described herein. If an access network of the mobile terminal is the VoLTE network, the application server determines whether the mobile terminal supports USSD operations over IMS (Unstructured Supplementary Service Data (USSD) operations over IP Multimedia Core Network Subsystem).

Currently, USSD services may include various services for acquiring common information, such as querying flight status, train running status, ship time schedule, stock information, cinema ticketing information, or weather reports, or the like.

The identifier of the USSD service is used for identifying a type of the USSD service.

When it is mentioned that the mobile terminal supports USSD operations over IMS, it means that on an IMS network, the mobile terminal can support a USSD service; and further, in this embodiment of the present invention, the VoLTE network is composed of an IMS core network and an LTE data access network, and the capability of the mobile terminal to support USSD operations over IMS may mean that on the VoLTE network, the mobile terminal can support a USSD service initiated from the network side.

When the application server determines that the access network of the mobile terminal is the VoLTE network and the mobile terminal supports USSD operations over INS, the application server sends an invite message to the mobile terminal through a call session control function (Call Session Control Function, CSCF for short) entity, where the invite message includes the identifier of the USSD service; and specifically, the application server may send the invite message to the mobile terminal through a serving-CSCF (Serving-CSCF, S-CSCF for short) entity and a proxy-CSCF (Proxy-CSCF, P-CSCF for short) entity.

By way of example and not by way of limitation, the invite message may be specifically an Invite message.

In this embodiment of the present invention, the subscriber data server specifically includes a home subscriber server (Home Subscriber Server, HSS for short), a home location register (Home Location Register, HLR for short), or a USSD center, where the USSD center mainly provides an interface for various application centers, for example, an interface for an application center such as a stock exchange or a bank, and the USSD center may further process a USSD service.

When the subscriber data server is a USSD center, the step in which the application server receives a USSD service message sent by a subscriber data server is specifically:

the application server receives, through an HLR or an HSS, the USSD service message sent by the USSD center.

In this embodiment of the present invention, the USSD service message specifically includes a USSD service request message or a USSD service notification message; the USSD service request message may be specifically a MAP_UNSTRUCTURED_SS_REQUEST_req message; and the USSD service notification message may be specifically a MAP_UNSTRUCTURED_SS_NOTIFY_req message.

Step 120: The application server receives an invite response, where the invite response is sent by the mobile terminal through the CSCF entity and carries reply information entered by a subscriber, and the reply information includes the identifier of the USSD service.

Specifically, after receiving the invite message, the mobile terminal sends a handshake message to the application server through the CSCF entity, to notify the application server that the invite message has been received, and establishes an SIP session with the application server; and after receiving the handshake message, the application server sends an acknowledgement message to the mobile terminal through the CSCF entity, to notify the mobile terminal that the handshake message has been received, and establishes the SIP session with the mobile terminal.

After receiving the invite message, the mobile terminal needs to parse the invite message and extracts the identifier of the USSD service from the invite message; the mobile terminal displays the identifier of the USSD service in a display area of the mobile terminal and receives the reply information entered by the subscriber, where the reply information is a reply made specifically to the identifier of the USSD service by the subscriber; and the mobile terminal generates the invite response by using the reply information.

By way of example and not by way of limitation, the invite response may be specifically an Info message.

Step 130: The application server generates, according to the reply information, a message that requests to execute the USSD service, where the message that requests to execute the USSD service carries the identifier of the USSD service.

Specifically, after receiving the invite response, the application server parses the invite response, extracts the reply information from the invite response message, and generates, by using the reply information, the message that requests to execute the USSD service.

By way of example and not by way of limitation, the message that requests to execute the USSD service may specifically include a MAP_UNSTRUCTURED_SS_REQUEST_rsp message or a MAP_UNSTRUCTURED_SS_NOTIFY_rsp message. Specifically, when the USSD service message is a USSD service request message, the message that requests to execute the USSD service is the MAP_UNSTRUCTURED_SS_REQUEST_rsp message; or when the USSD service message is a USSD service notification message, the message that requests to execute the USSD service is the MAP_UNSTRUCTURED_SS_NOTIFY_rsp message.

Step 140: The application server sends, to the subscriber data server, the message that requests to execute the USSD service, so that the subscriber data server processes the USSD service according to the identifier of the USSD service carried in the message that requests to execute the USSD service.

Specifically, after receiving the message that requests to execute the USSD service, the subscriber data server parses the message that requests to execute the USSD service, and extracts the reply information and the identifier of the USSD service that are carried in this message. In a specific implementation, after extracting the reply information and the identifier of the USSD service, the subscriber data server concludes, according to the identifier of the USSD service, that the reply information of the subscriber is a reply specific to the USSD service corresponding to the identifier of the USSD service. When the subscriber data server ascertains that this USSD service may be processed according to the reply information entered by the subscriber, the subscriber data server processes this USSD service according to the reply information; after the processing is complete, the subscriber data server sends a close message to the application server; after receiving the close information, the application server releases connection to the subscriber data server and sends, through the CSCF entity, an end message to the mobile terminal; after receiving the end message, the mobile terminal releases the SIP session with the network side and sends a handshake message to the application server through the CSCF entity, to notify the application server that the mobile terminal has received the end message; after receiving the handshake message, the application server also releases the SIP session with the mobile terminal; and till now, the USSD service initiated from the network side is completed.

In another specific implementation, when the subscriber data server considers that further communication interaction with the subscriber needs to be performed after extracting the reply information, the subscriber data server continues to send a USSD service message to the application server; the application server sends the USSD service message to the mobile terminal through the CSCF entity and repeats step 120 and step 130 until the subscriber data server considers that the USSD service may be processed according to the reply information entered by the subscriber. Then, the subscriber data server processes this USSD service according to the reply information; after the processing is completed, the subscriber data server sends a close message to the application server; after receiving the close message, the application server releases connection to the subscriber data server and sends an end message to the mobile terminal through the CSCF entity; after receiving the end message, the mobile terminal releases the SIP session with the network side and sends a handshake message to the application server through the CSCF entity, to notify the application server that the end message has been received; after receiving the handshake message, the application server also releases the SIP session with the mobile terminal; and till now, the USSD service initiated from the network side is completed.

When the subscriber data server is a USSD center, the application server sends, to the USSD center through an HLR or an HSS, the message that requests to execute the USSD service.

By way of example and not by way of limitation, the close message may be specifically a MAP_CLOSE_IND message, and the end message may be specifically a BYE message.

More further, in an actual use case, when the USSD service message sent by the subscriber data server is a USSD service notification message, the subscriber data server sends the USSD service notification message only once, completes this USSD service according to a reply information, and sends a session close message to the application server to terminate this USSD service.

When the USSD service message sent by the subscriber data server is a USSD service request message, the subscriber data server may send the USSD service request message at least once, complete this USSD service according to reply information to the at least one USSD service notification message, and send a session close message to the application server to terminate this USSD service.

In the method for processing USSD service according to this embodiment of the present invention, when a mobile terminal on a VoLTE network supports USSD operations over IMS, an application server sends a message carrying a USSD service to the mobile terminal and sends a message carrying reply information to a subscriber data server, so that the subscriber data server processes the USSD service according to the message carrying the reply information. This eliminates the limitation in the prior art due to absence of standards defining how a USSD service is initiated from a network side to a mobile terminal on a VoLTE network.

To make the objectives, technical solutions, and advantages of the present invention clearer, the following further describes specific embodiments of the present invention in detail with reference to the accompanying drawings.

Figure 3:
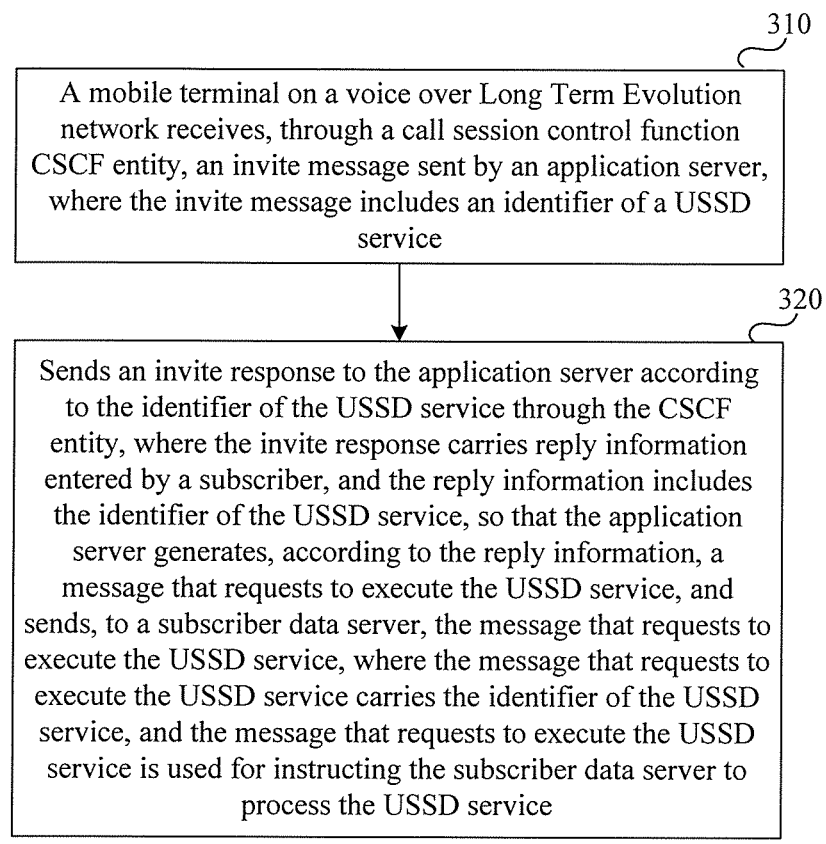
FIG. 3 is a flowchart of a method for processing USSD service according to Embodiment 2 of the present invention.

The following uses FIG. 3 as an example for describing a method for processing USSD service according to Embodiment 2 of the present invention. FIG. 3 is a flowchart of the method for processing USSD service according to Embodiment 2 of the present invention. This embodiment of the present invention is executed by a mobile terminal on a VoLTE network. As shown in FIG. 3, the embodiment includes the following steps:

Step 310: A mobile terminal on a voice over Long Term Evolution network receives, through a CSCF entity, an invite message sent by an application server, where the invite message includes an identifier of the USSD service.

Specifically, before the mobile terminal receives, through the CSCF entity, the invite message sent by the application server, the application server receives a USSD service message sent by a subscriber data server, where the USSD service message carries identification information of the mobile terminal and the identifier of the USSD service, and the application server determines an access network of the mobile terminal according to the identification information of the mobile terminal.

When the mobile terminal on the VoLTE network supports USSD operations over IMS, the application server sends the invite message to the mobile terminal through the CSCF entity, where the invite message includes identifier of the USSD service; and specifically, the application server may send the invite message to the mobile terminal through an S-CSCF entity and a P-CSCF entity.

In this embodiment of the present invention, the USSD service message sent by the subscriber data server specifically includes a USSD service request message or a USSD service notification message.

By way of example and not by way of limitation, the invite message is specifically an Invite message.

In this embodiment of the present invention, the subscriber data server specifically includes an HSS, an HLR, or a USSD center.

Step 320: According to the identifier of the USSD service, the mobile terminal send an invite response to the application server through the CSCF entity, where the invite response carries reply information entered by a subscriber, and the reply information includes the identifier of the USSD service so that the application server generates, according to the reply information, a message that requests to execute the USSD service and sends, to the subscriber data server, the message that requests to execute the USSD service, where the message that requests to execute the USSD service carries the identifier of the USSD service, and the message that requests to execute the USSD service is used for instructing the subscriber data server to process the USSD service.

Specifically, after receiving the invite message, the mobile terminal sends a handshake message to the application server through the CSCF entity, to notify the application server that the invite message has been received, and establishes an SIP session with the application server; and after receiving the handshake message, the application server sends an acknowledgement message to the mobile terminal through the CSCF entity, to notify the mobile terminal that the handshake message has been received, and establishes the SIP session with the mobile terminal.

After receiving the invite message, the mobile terminal parses the invite message and extracts the identifier of the USSD service from the invite message; the mobile terminal displays the identifier of the USSD service in a display area of the mobile terminal and receives the reply information entered by the subscriber, where the reply information is a reply made specifically to the identifier of the USSD service by the subscriber; and the mobile terminal generates the invite response by using the reply information.

By way of example and not by way of limitation, the invite response may be specifically an Info message.

The mobile terminal sends the invite response to the application server through the CSCF entity; after receiving the invite response, the application server needs to parse the invite response, extract the reply information from the invite response message, generate, by using the reply information, the message that requests to execute the USSD service, and send, to the subscriber data server, the message that requests to execute the USSD service; and the subscriber data server processes the USSD service according to the identifier of the USSD service carried in the message that requests to execute the USSD service.

Embodiment 1 has described in detail how the subscriber data server completes the USSD service according to the message that requests to execute the USSD service, and no detail is repeatedly described herein.

In the method for processing USSD service according to this embodiment of the present invention, when a mobile terminal on a VoLTE network supports USSD operations over IMS, it receives a message that carries a USSD service and is sent by an application server, sends to an application server reply information that is made specifically to the USSD service by the subscriber, so that the application server sends a message carrying the reply information to a subscriber data server and the subscriber data server processes the USSD service according to the message carrying the reply information. This eliminates the limitation in the prior art due to absence of standards defining how a USSD service is initiated from a network side to a mobile terminal on a VoLTE network.

Figure 4:
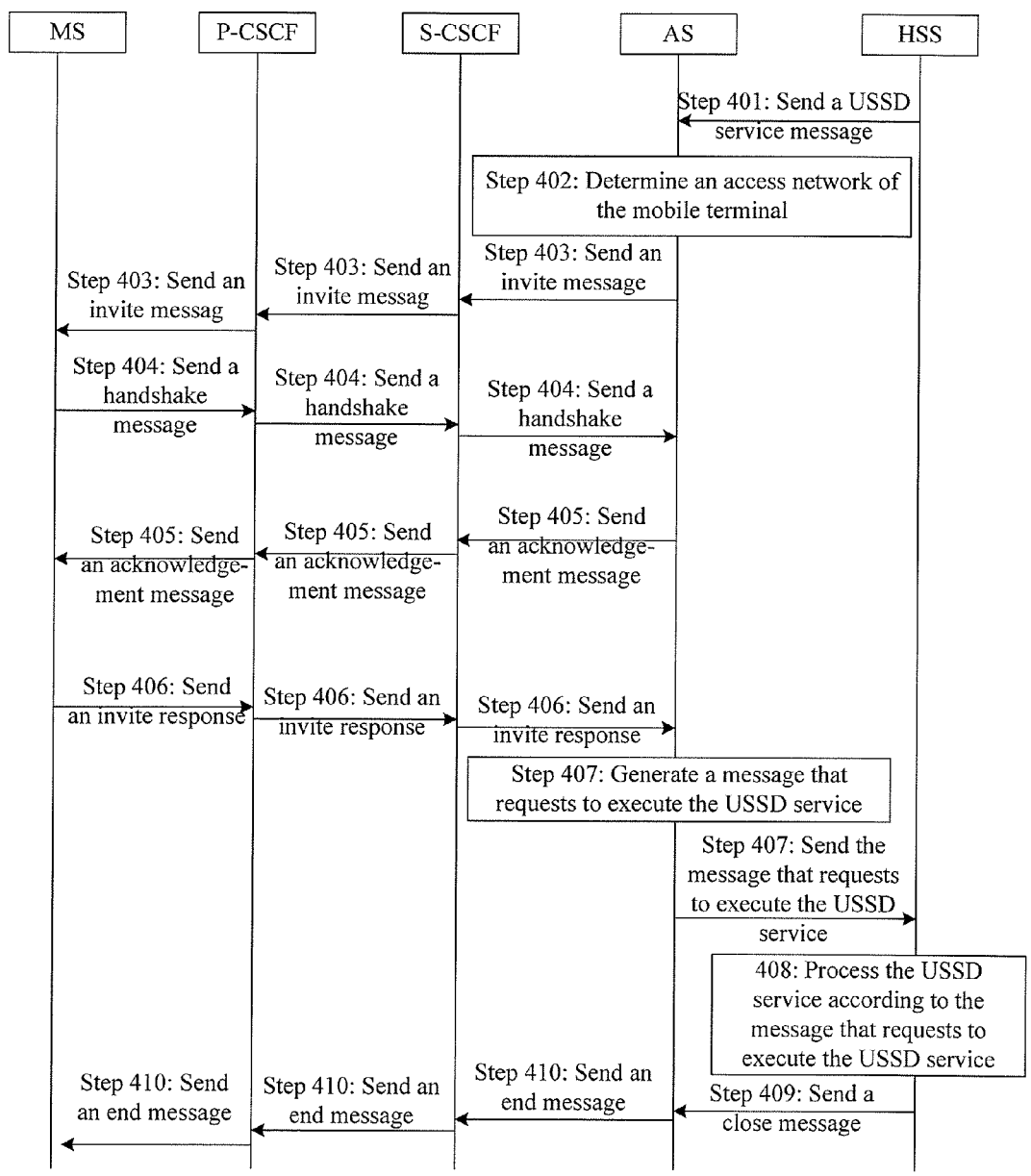
FIG. 4 is a signaling flowchart of a method for processing USSD service according to an embodiment of the present invention.
Figure 5:
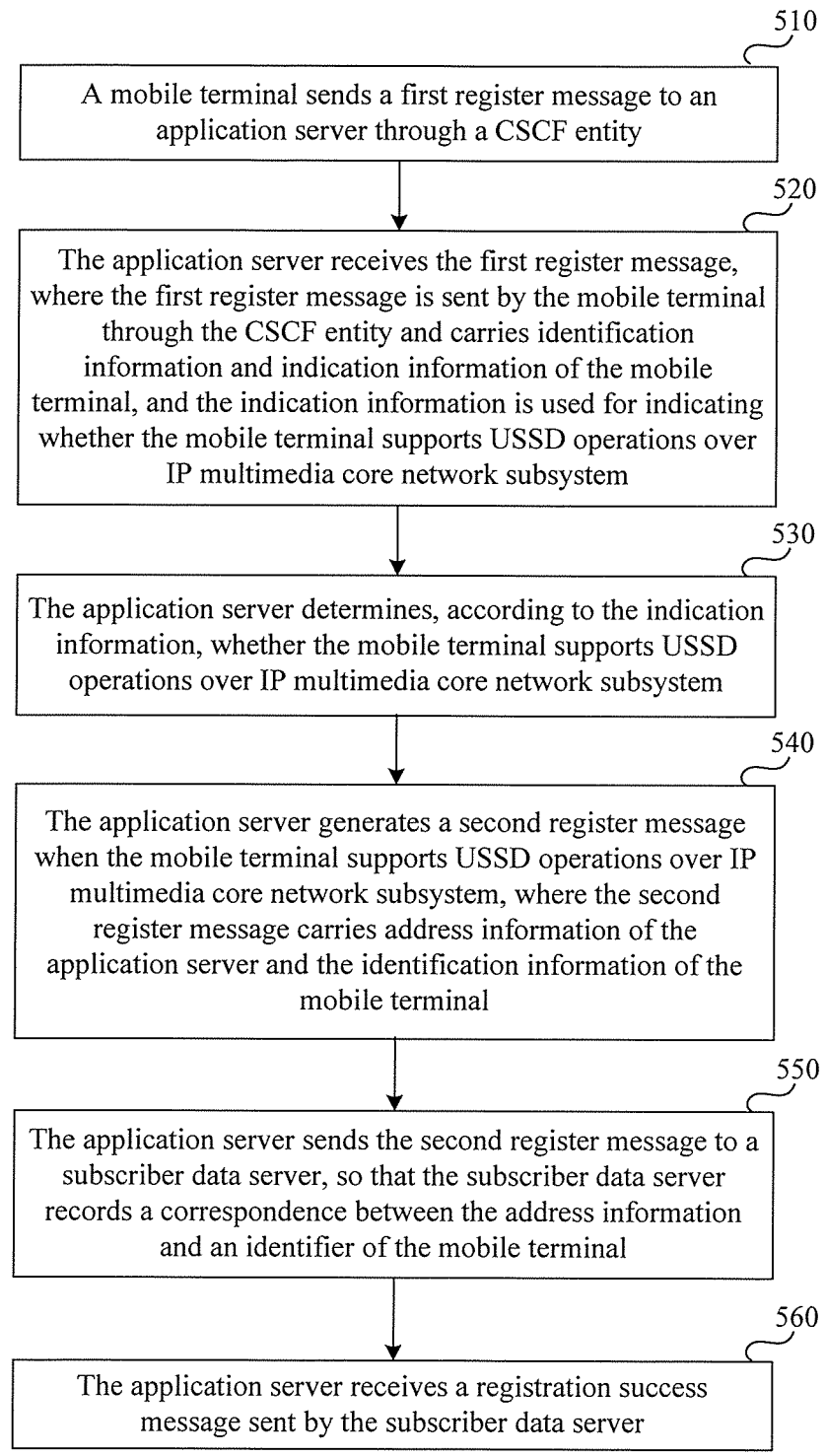
FIG. 5 is a flowchart of registration by a mobile terminal according to Embodiment 3 of the present invention.

The foregoing two embodiments describe the method for processing USSD service from the perspective of an application server and a mobile terminal respectively. Further, the procedure for processing the USSD service described in the foregoing embodiments may be completed by means of a signaling flow shown in FIG. 4. FIG. 4 is a signaling flowchart of a method for processing USSD service according to an embodiment of the present invention. In this embodiment, a subscriber data server is an HSS, and the signaling flow is similar to when a subscriber data server is an HLR. Therefore, no detail is repeatedly described herein. As shown in FIG. 4, the method specifically includes the following steps:

Step 401: An HSS sends a USSD service message to an application server, where the USSD service message carries identification information of a mobile terminal and an identifier of a USSD service.

Specifically, the HSS may automatically send the USSD service message to the application server, where the USSD service message carries the identification information of the mobile terminal and the identifier of the USSD service.

A specific form of the USSD service message has been described in the foregoing embodiments of the present invention, and no detail is repeatedly described herein.

Step 402: The application server determines an access network of the mobile terminal.

Specifically, after receiving the USSD service message sent by the HSS, the application server determines the access network of the mobile terminal according to the identification information of the mobile terminal.

Step 403: The application server sends an invite message to the mobile terminal through a CSCF entity.

Specifically, when the application server determines that the access network of the mobile terminal is a VoLTE network, the application server determines whether the mobile terminal supports USSD operations over IMS.

When the application server determines that the mobile terminal supports USSD operations over IMS, the application server sends the invite message to the mobile terminal through the CSCF entity, where the invite message includes the identifier of the USSD service; and specifically, the application server in this embodiment of the present invention may send the invite message to the mobile terminal through an S-CSCF entity and a P-CSCF entity.

The procedure in which the application server sends the invite message to the mobile terminal through the CSCF entity, and a specific form of the invite message have been described in the foregoing embodiments of the present invention.

Step 404: The mobile terminal sends a handshake message to the application server through the CSCF entity.

The procedure of sending, by the mobile terminal, a handshake message to the application server through the CSCF entity has been described in the foregoing embodiments of the present invention, and no detail is repeatedly described herein.

Step 405: The application server sends an acknowledgement message to the mobile terminal through the CSCF entity.

The procedure of sending, by the application server, an acknowledgement message to the mobile terminal through the CSCF entity has been described in the foregoing embodiments of the present invention, and no detail is repeatedly described herein.

Step 406: The mobile terminal sends an invite response to the application server through the CSCF entity, where the invite response carries reply information entered by a subscriber, and the reply information includes the identifier of the USSD service.

Specifically, after receiving the invite message, the mobile terminal receives the reply information entered by the subscriber, and the mobile terminal generates the invite response by using the reply information.

The procedure of sending, by the application server, an acknowledgement message to the mobile terminal through the CSCF entity, and a specific form of the invite response have been described in the foregoing embodiments of the present invention, and no detail is repeatedly described herein.

Step 407: The application server generates, according to the reply information, a message that requests to execute the USSD service and sends, to the HSS, the message that requests to execute the USSD service.

Specifically, after receiving the invite response, the application server parses the invite response, extracts the reply information from the invite response message, and generates, by using the reply information, the message that requests to execute the USSD service.

The procedure of generating, by the application server according to the reply information, the message that requests to execute the USSD service and sending, to the HSS, the message that requests to execute the USSD service has been described in the foregoing embodiments of the present invention, and no detail is repeatedly described herein.

A specific form of the message that requests to execute the USSD service has been described in the foregoing embodiments of the present invention, and no detail is repeatedly described herein.

Step 408: The HSS processes the USSD service according to the identifier of the USSD service carried in the message that requests to execute the USSD service.

Specifically, after receiving the message that requests to execute the USSD service, the subscriber data server parses the message that requests to execute the USSD service, and extracts the reply information and the identifier of the USSD service that are carried in this message.

The procedure of processing, by the application server, the USSD service according to the identifier of the USSD service carried in the message that requests to execute the USSD service has been described in the foregoing embodiments of the present invention, and no detail is repeatedly described herein.

Step 409: The HSS sends a close message to the application server.

The procedure of sending, by the HSS, a close message to the application server has been described in the foregoing embodiments of the present invention, and no detail is repeatedly described herein.

Step 410: The application server sends an end message to the mobile terminal through the CSCF entity.

The procedure of sending, by the application server, an end message to the mobile terminal through the CSCF entity has been described in the foregoing embodiments of the present invention, and no detail is repeatedly described herein.

Further, when a USSD service is initiated by a USSD center, a specific procedure is similar as described in the foregoing embodiments, and no detail is repeatedly described herein.

To make the objectives, technical solutions, and advantages of the present invention clearer, the following further describes specific embodiments of the present invention in detail with reference to the accompanying drawings.

Before step 110 in Embodiment 1 of the present invention, a step of registering a mobile terminal may be further included. The step of registering a mobile terminal may simplify the procedure of determining an access network of a mobile terminal by an application server. The following uses Embodiment 3 to describe the step of registering a mobile terminal. Embodiment 3 of the present invention is executed by an application server.

Step 510: A mobile terminal sends a first register message to an application server through a CSCF entity.

Specifically, the mobile terminal sends the first register message to the CSCF entity. Specifically, the mobile terminal may send the first register message to a P-CSCF entity, and after receiving the first register message, the P-CSCF entity sends a handshake message to the mobile terminal to notify the mobile terminal that the first register message has been received.

Step 520: The application server receives the first register message, where the first register message is sent by the mobile terminal through the CSCF entity and carries identification information and indication information of the mobile terminal, and the indication information is used for indicating whether the mobile terminal supports USSD operations over IP multimedia core network subsystem.

Specifically, after receiving the first register message, the CSCF entity sends a handshake message to the mobile terminal to notify the mobile terminal that the first register message has been received; the CSCF entity further forwards the first register message to the application server; after receiving the first register message forwarded by the CSCF entity, the application server sends a handshake message to the CSCF entity to notify the CSCF entity that the first register message has been received, where the identification information and the indication information of the mobile terminal are carried in a header (CONTACT) of the first register message, and the indication information is specifically used for indicating whether the mobile terminal supports USSD operations over IMS.

By way of example and not by way of limitation, the first register message may be specifically a REGISTER message and the indication information may be specifically a parameter, +g.3gpp.ussd, which is not limited in the present invention.

Step 530: The application server determines, according to the indication information, whether the mobile terminal supports USSD operations over IP multimedia core network subsystem.

Specifically, the application server determines, according to the indication information, whether the mobile terminal supports USSD operations over IMS, and stores the identification information of the mobile terminal and a result of the determining in a local database.

Further, the application server stores the identification information of the mobile terminal and the result of the determining in the local database, so that in the step 110, in Embodiment 1, of determining whether the mobile terminal supports USSD operations over IMS, the application server searches, according to the identification information of the mobile terminal, the local database for the determining result of a corresponding mobile terminal, thereby completing the determining process.

Step 540: The application server generates a second register message when the mobile terminal supports USSD operations over IP multimedia core network subsystem, where the second register message carries address information of the application server and the identification information of the mobile terminal.

Specifically, the application server generates the second register message when the mobile terminal supports USSD operations over IMS, where the second register message carries the address information of the application server and the identification information of the mobile terminal.

Step 550: The application server sends the second register message to a subscriber data server, so that the subscriber data server records a correspondence between the address information and an identifier of the mobile terminal.

Specifically, the application server sends the generated second register message to the subscriber data server, so that the subscriber data server records the correspondence between the address information and the identifier of the mobile terminal.

When the subscriber data server is an HLR, the application server sends the second register message to the HLR through a first interface, so that the HLR records the correspondence between the address information and the identifier of the mobile terminal; and when the subscriber data server is an HSS, the application server sends the second register message to the HSS through a second interface, so that the HSS records the correspondence between the address information and the identifier of the mobile terminal.

Step 560: The application server receives a registration success message sent by the subscriber data server.

Specifically, after recording the correspondence between the address information and the identifier of the mobile terminal, the subscriber data server sends the registration success message to the application server.

In a preferred example, when the subscriber data server is an HLR or an HSS and a preset address information exists in the subscriber data server, it is identified whether the address information carried in the second register message is the same as the preset address information; if the address information carried in the second register message is the same as the preset address information, the registration success message is sent to the application server, or if the address information carried in the second register message is different from the preset address information, a register failure message is sent.

Further, when the subscriber data server is an HLR or an HSS, the application server sends the second register message to the subscriber data server, so that the subscriber data server sends a USSD service message to a registered application server when sending the USSD service message, or sends a USSD service message to an application server corresponding to the preset address information.

More further, in this embodiment of the present invention, the first interface is a J interface, the second registration information may be specifically a MAP_ATM_Req message, the second interface is an Sh interface, and the second registration information may be specifically an Sh_PUR message.

Figure 6:
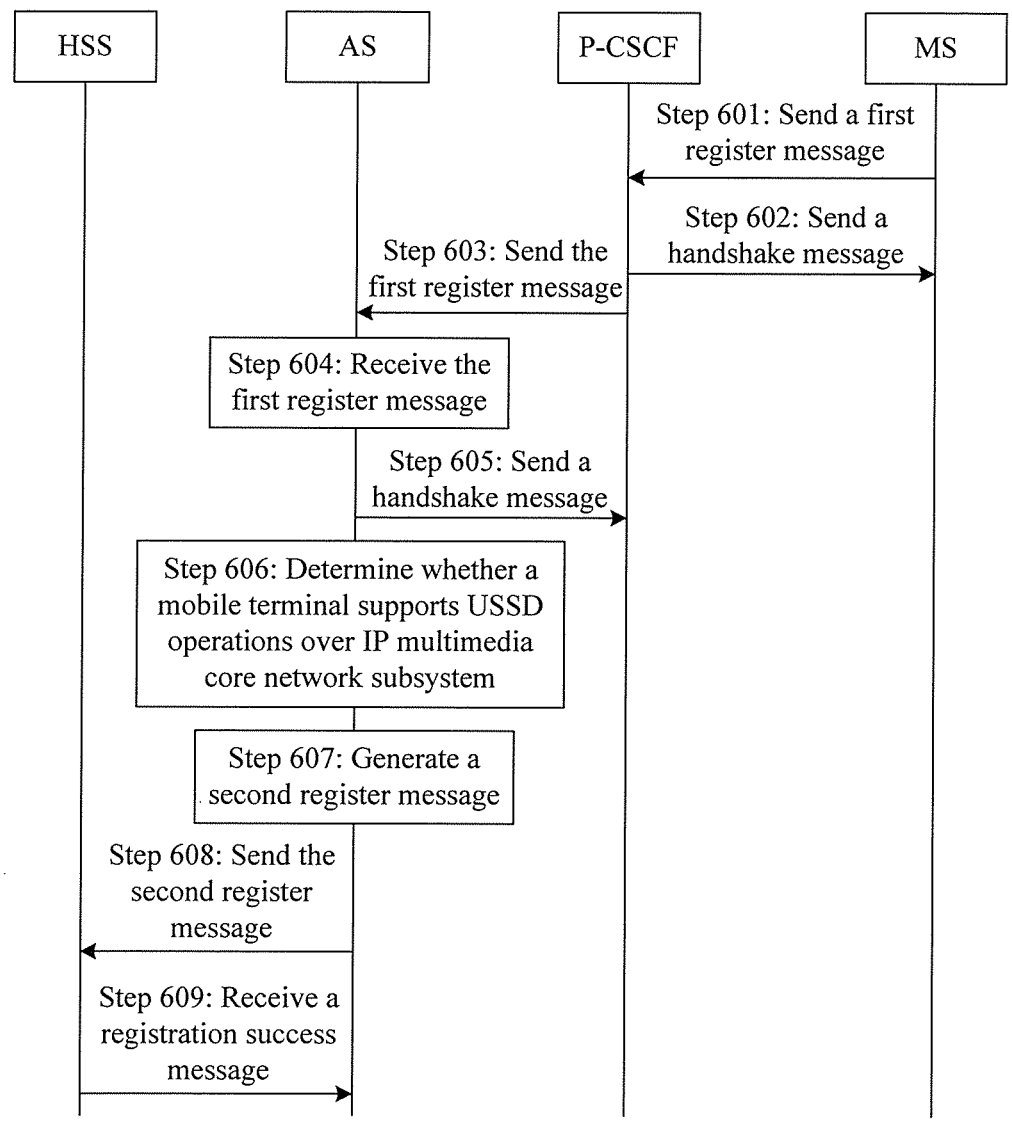
FIG. 6 is a signaling flowchart depicting a registration process of a mobile terminal according to an embodiment of the present invention.

The foregoing Embodiment 3 describes the registration process of the mobile terminal. Further, the registration process of the mobile terminal according to the foregoing Embodiment 3 may be completed by means of a signaling flow shown in FIG. 6. FIG. 6 is a signaling flowchart of a registration process of a mobile terminal according to an embodiment of the present invention. In this embodiment, a subscriber data server is an HSS, and the signaling flow is similar to when a subscriber data server is an HLR. Therefore, no detail is repeatedly described herein. As shown in FIG. 6, the registration process specifically includes the following steps:

Step 601: A mobile terminal sends a first register message to a CSCF entity.

Specifically, the mobile terminal sends the first register message to the CSCF entity. Further, in this embodiment of the present invention, the mobile terminal may send the first register message to a P-CSCF entity, and after receiving the first register message, the P-CSCF entity sends a handshake message to the mobile terminal to notify the mobile terminal that the first register message has been received.

The first register message carries identification information and indication information of the mobile terminal, where the indication information is specifically used for indicating whether the mobile terminal supports USSD operations over INS.

Step 602: The CSCF entity sends a handshake message to the mobile terminal.

The process of sending, by the CSCF entity, a handshake message to the mobile terminal has been described in the foregoing Embodiment 3 of the present invention, and no detail is repeatedly described herein.

Step 603: The CSCF entity sends the first register message to the application server.

Specifically, after receiving the first register message, the CSCF entity forwards the first register message to the application server.

Step 604: The application server receives the first register message, where the first register message is sent by the mobile terminal through the CSCF entity.

Specifically, the application server receives the first register message forwarded by the CSCF entity.

A specific form of the first register message has been described in the foregoing Embodiment 3 of the present invention, and no detail is repeatedly described herein.

Step 605: The application server sends a handshake message to the CSCF entity.

The process of sending, by the application server, a handshake message to the CSCF entity has been described in the foregoing Embodiment 3 of the present invention, and no detail is repeatedly described herein.

Step 606: The application server determines, according to the indication information, whether the mobile terminal supports USSD operations over IP multimedia core network subsystem.

Specifically, the application server determines, according to the indication information, whether the mobile terminal supports USSD operations over IMS, and stores the identification information of the mobile terminal and a result of the determining in a local database.

Step 607: The application server generates a second register message when the mobile terminal supports USSD operations over IP multimedia core network subsystem, where the second register message carries address information of the application server and the identification information of the mobile terminal.

Specifically, the application server generates the second register message when the mobile terminal supports USSD operations over IMS, where the second register message carries the address information of the application server and the identification information of the mobile terminal.

Step 608: The application server sends the second register message to the HSS, so that the HSS records a correspondence between the address information and an identifier of the mobile terminal.

Specifically, the application server sends the generated second register message to the HSS, so that the HSS records the correspondence between the address information and the identifier of the mobile terminal.

The procedure of sending, by the application server, the second register message to the HSS has been described in the foregoing Embodiment 3 of the present invention, and no detail is repeatedly described herein.

Step 609: The application server receives a registration success message sent by the HSS.

Specifically, the HSS sends the registration success message to the application server after recording the correspondence between the address information and the identifier of the mobile terminal.

Figure 7:
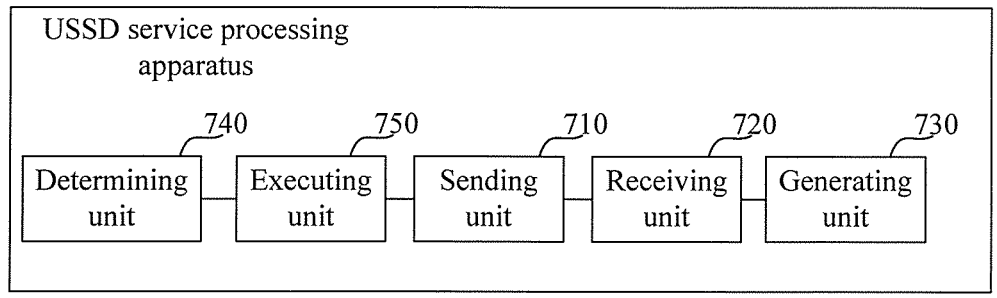
FIG. 7 is a diagram of an apparatus for processing USSD service according to Embodiment 4 of the present invention.

Correspondingly, Embodiment 4 of the present invention further provides an apparatus for processing USSD service, to implement the method for processing USSD service in Embodiment 1. As shown in FIG. 7, the apparatus for processing USSD service includes: a sending unit 710, a receiving unit 720, and a generating unit 730.

The sending unit 710 of the apparatus is configured to: when it is determined that a mobile terminal on a voice over Long Term Evolution network supports USSD operations over IP multimedia core network subsystem, send an invite message to the mobile terminal through a call session control function (CSCF) entity, where the invite message includes an identifier of the USSD service;

the receiving unit 720 is configured to receive an invite response, where the invite response is sent by the mobile terminal through the CSCF entity and carries reply information entered by a subscriber, and the reply information includes the identifier of the USSD service;

the generating unit 730 is configured to generate, according to the reply information received by the receiving unit, a message that requests to execute the USSD service, where the message that requests to execute the USSD service carries the identifier of the USSD service; and the sending unit 710 is further configured to send, to a subscriber data server, the message that requests to execute the USSD service and is generated by the generating unit, so that the subscriber data server processes the USSD service according to the identifier of the USSD service carried in the message that requests to execute the USSD service.

The receiving unit 720 is further configured to receive a USSD service message sent by the subscriber data server, where the USSD service message carries identification information of the mobile terminal and the identifier of the USSD service;

the apparatus further includes: a determining unit 740, configured to determine an access network of the mobile terminal according to the identification information of the mobile terminal; and an executing unit 750, configured to: if the access network of the mobile terminal is the voice over Long Term Evolution network, determine whether the mobile terminal supports USSD operations over IP multimedia core network subsystem.

The subscriber data server includes a home subscriber server, a home location register, or a USSD center.

When the subscriber data server is a USSD center, the receiving unit 720 is specifically configured to receive, through a home subscriber server or a home location register, the USSD service message sent by the USSD center; and the sending unit is specifically configured to send, to the USSD center through the home subscriber server or the home location register, the message that requests to execute the USSD service.

When the subscriber data server is a home subscriber server or a home location register, the receiving unit 720 is further configured to receive a first register message, where the first register message is sent by the mobile terminal through the CSCF entity and carries the identification information and indication information of the mobile terminal, and the indication information is used for indicating whether the mobile terminal supports USSD operations over IP multimedia core network subsystem;

the executing unit 750 is further configured to determine, according to the indication information received by the receiving unit, whether the mobile terminal supports USSD operations over IP multimedia core network subsystem;

the generating unit 730 is further configured to generate a second register message when the executing unit determines that the mobile terminal supports USSD operations over IMS, where the second register message carries address information of the application server and the identification information of the mobile terminal; and the sending unit 710 is further configured to send, to the subscriber data server, the second register message generated by the generating unit, so that the subscriber data server records a correspondence between the address information and an identifier of the mobile terminal.

The receiving unit 720 is further configured to receive a registration success message sent by the subscriber data server.

When a mobile terminal on a VoLTE network supports USSD operations over IMS, the apparatus for processing USSD service according to this embodiment of the present invention sends information carrying a USSD service to the mobile terminal and sends a message carrying reply information to a subscriber data server, so that the subscriber data server processes the USSD service according to the message carrying the reply information. This eliminates the limitation in the prior art due to absence of standards defining how a USSD service is initiated from a network side to a mobile terminal on a VoLTE network is defined.

Figure 8:
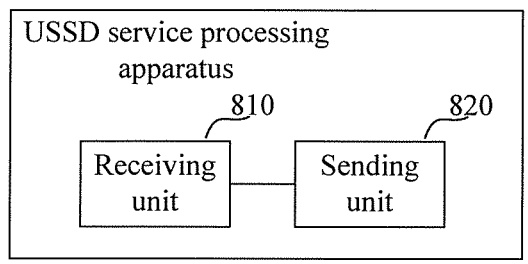
FIG. 8 is a diagram of an apparatus for processing USSD service according to Embodiment 5 of the present invention.

Correspondingly, Embodiment 5 of the present invention further provides a apparatus for processing USSD service, to implement the method for processing USSD service in Embodiment 2. As shown in FIG. 8, the apparatus for processing USSD service includes: a receiving unit 810 and a sending unit 820.

The apparatus is located on a voice over Long Term Evolution LTE network, and the receiving unit 810 of the apparatus is configured to receive, through a CSCF entity, an invite message sent by an application server, where the invite message includes an identifier of the USSD service; and the sending unit 820 is configured to: send, through the CSCF entity, an invite response to the application server according to the identifier of the USSD service included in the invite message received by the receiving unit, where the invite response carries reply information entered by a subscriber, so that the application server generates, according to the reply information, a message that requests to execute the USSD service and sends, to a subscriber data server, the message that requests to execute the USSD service, where the message that requests to execute the USSD service carries the identifier of the USSD service, and the message that requests to execute the USSD service is used for instructing the subscriber data server to process the USSD service.

The sending unit 820 is further configured to: send a first register message to the application server through the CSCF entity, where the first register message carries identification information and indication information of the mobile terminal, and the indication information is used for indicating whether the mobile terminal supports USSD operations over IP multimedia core network subsystem, so that the application server generates a second register message when determining, according to the indication information, that the mobile terminal supports USSD operations over IP multimedia core network subsystem INS, where the second register message carries address information of the application server and the identifier of the mobile terminal, and sends the second register message to the subscriber data server, and the subscriber data server records a correspondence between the address information and the identifier of the mobile terminal according to the second register message.

The subscriber data server includes a home subscriber server, a home location register, or a USSD center.

When the apparatus for processing USSD service according to this embodiment of the present invention is located on a VoLTE network and supports USSD operations over IMS, it receives information that carries a USSD service from an application server, and sends reply information that is made specifically to the USSD service by the subscriber to the application server, so that the application server sends a message carrying the reply information to a subscriber data server, and the subscriber data server processes the USSD service according to the message carrying the reply information. This eliminates the limitation in the prior art due to absence of standards defining how a USSD service is initiated from a network side to a mobile terminal on a VoLTE network.

Figure 9:
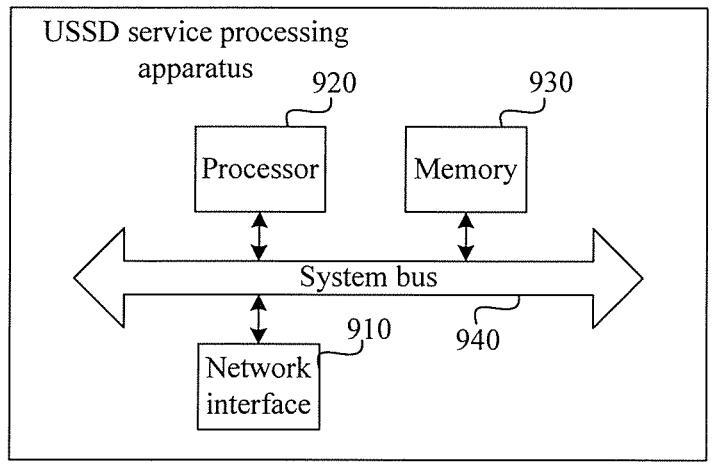
FIG. 9 is a diagram of an apparatus for processing USSD service according to Embodiment 6 of the present invention.

In addition, the apparatus for processing USSD service according to Embodiment 4 of the present invention may be further implemented in the following manner. As shown in FIG. 9, the apparatus for processing USSD service includes: a network interface 910, a processor 920, and a memory 930.

The network interface 910 is configured to perform interactive communication with a CSCF entity and a subscriber data server.

The memory 930 may be a permanent store, for example, a hard disk drive or a flash memory, and the memory 930 has a software module and a device driver. The software module can execute various function modules in the foregoing method of the present invention; and the device driver may be a network and interface driver.

During startup, these software components are loaded to the memory 930, and then executed by the processor 920. When executing the software components of the memory 930, the processor 920 can implement the following functions:

when the application server determines that a mobile terminal on a voice over Long Term Evolution network supports USSD operations over IP multimedia core network subsystem, sending, by the application server, an invite message to the mobile terminal through a call session control function (CSCF) entity, where the invite message includes an identifier of the USSD service;

receiving an invite response, where the invite response is sent by the mobile terminal through the CSCF entity and carries reply information entered by the subscriber, and the reply information includes the identifier of the USSD service;

generating, according to the reply information, a message that requests to execute the USSD service, where the message that requests to execute the USSD service carries the identifier of the USSD service; and sending, to a subscriber data server, the message that requests to execute the USSD service, so that the subscriber data server processes the USSD service according to the identifier of the USSD service carried in the message that requests to execute the USSD service.

Further, after accessing the software components of the memory 930, the processor may further implement the following functions:

receiving a USSD service message sent by the subscriber data server, where the USSD service message carries identification information of the mobile terminal and the identifier of the USSD service;

determining an access network of the mobile terminal according to the identification information of the mobile terminal; and if the access network of the mobile terminal is the voice over Long Term Evolution network, determining whether the mobile terminal supports USSD operations over IP multimedia core network subsystem.

Further, the subscriber data server includes a home subscriber server, a home location register, or a USSD center.

Further, after accessing the software components of the memory 930, the processor may further implement the following functions:

when the subscriber data server is a USSD center, the receiving a USSD service message sent by the subscriber data server includes:

receiving, through a home subscriber server or a home location register, the USSD service message sent by the USSD center; and the sending, to a subscriber data server, the message that requests to execute the USSD service includes:

sending, to the USSD center through the home subscriber server or the home location register, the message that requests to execute the USSD service.

Further, in the event that the subscriber data server is a home subscriber server or a home location register, before receiving the USSD service message sent by the subscriber data server and after accessing the software components of the memory 930, the processor may further implement the following functions:

receiving a first register message, where the first register message is sent by the mobile terminal through the CSCF entity and carries the identification information and indication information of the mobile terminal, and the indication information is used for indicating whether the mobile terminal supports USSD operations over IP multimedia core network subsystem;

determining, according to the indication information, whether the mobile terminal supports USSD operations over IP multimedia core network subsystem;

generating a second register message when the mobile terminal supports USSD operations over IP multimedia core network subsystem, where the second register message carries address information of the application server and the identification information of the mobile terminal;

sending the second register message to the subscriber data server, so that the subscriber data server records a correspondence between the address information and the identifier of the mobile terminal; and receiving a registration success message sent by the subscriber data server.

When a mobile terminal on a VoLTE network supports USSD operations over IMS, the apparatus for processing USSD service according to this embodiment of the present invention sends a message carrying a USSD service to the mobile terminal and sends a message carrying reply information to a subscriber data server, so that the subscriber data server processes the USSD service according to the message carrying the reply information. This eliminates the limitation in the prior art due to absence of standards defining how a USSD service is initiated from a network side to a mobile terminal on a VoLTE network.

Figure 10:
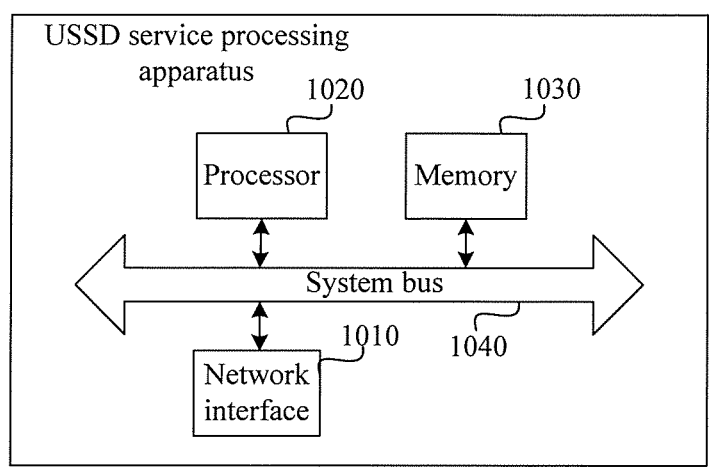
FIG. 10 is a diagram of an apparatus for processing USSD service according to Embodiment 7 of the present invention.

In addition, the apparatus for processing USSD service according to Embodiment 5 of the present invention may be further implemented in the following manner. As shown in FIG. 10, the apparatus for processing USSD service includes: a network interface 1010, a processor 1020, and a memory 1030.

The network interface 1010 is configured to perform interactive communication with a CSCF entity and an application server.

The memory 1030 may be a permanent store, for example, a hard disk drive or a flash memory, and the memory 1030 has a software module and a device driver. The software module can execute various function modules in the foregoing method of the present invention; and the device driver may be a network and interface driver.

During startup, these software components are loaded to the memory 1030, and then executed by the processor 1020. When executing the software components of the memory 1030, the processor 1020 can implement the following functions:

receiving, by a mobile terminal on a voice over Long Term Evolution network through a call session control function (CSCF) entity, an invite message sent by an application server, where the invite message includes an identifier of the USSD service; and sending an invite response to the application server according to the identifier of the USSD service through the CSCF entity, where the invite response carries reply information entered by a subscriber, and the reply information includes the identifier of the USSD service, so that the application server generates, according to the reply information, a message that requests to execute the USSD service and sends, to a subscriber data server, the message that requests to execute the USSD service, where the message that requests to execute the USSD service carries the identifier of the USSD service, and the message that requests to execute the USSD service is used for instructing the subscriber data server to process the USSD service.

Further, after accessing the software components of the memory 1030, the processor may further implement the following functions:

sending a first register message to the application server through the CSCF entity, where the first register message carries identification information and indication information of the mobile terminal, and the indication information is used for indicating whether the mobile terminal supports USSD operations over IP multimedia core network subsystem, so that the application server generates a second register message when determining, according to the indication information, that the mobile terminal supports USSD operations over IP multimedia core network subsystem, where the second register message carries address information of the application server and an identifier of the mobile terminal, and sends the second register message to the subscriber data server, so that the subscriber data server records a correspondence between the address information and the identifier of the mobile terminal according to the second register message.

The subscriber data server includes a home subscriber server, a home location register, or a USSD center.

When the apparatus for processing USSD service according to this embodiment of the present invention is located on a VoLTE network and supports USSD operations over IMS, it receives information that carries a USSD service from an application server, and sends reply information that is made specifically to the USSD service by the subscriber to the application server, so that the application server sends a message carrying the reply information to a subscriber data server, and the subscriber data server processes the USSD service according to the message carrying the reply information. This eliminates the limitation in the prior art due to absence of standards defining how a USSD service is initiated from a network side to a mobile terminal on a VoLTE network.

Based on descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

It should be noted that the embodiments in this specification are all described in a progressive manner, for same or similar parts in the embodiments, reference may be made to the embodiments, and each embodiment focuses on a difference from other embodiments. Especially, an apparatus embodiment is basically similar to a method embodiment, and therefore is described briefly; for execution processes of specific functions of each unit, reference may be made to partial descriptions in the method embodiment. The described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present invention without creative efforts.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A method for processing unstructured supplementary service data (USSD) service, wherein the method is executed in an application server, the method comprising:
   sending an invite message to a mobile terminal on a voice over Long Term Evolution network when the application server determines that the mobile terminal supports USSD operations over IP multimedia core network subsystem, wherein the invite message comprises an identifier of a USSD service;
   receiving an invite response from the mobile terminal, wherein the invite response carries reply information entered by a subscriber and the identifier of the USSD service;
   generating, according to the reply information, a message that requests to execute the USSD service, wherein the message that requests to execute the USSD service carries the identifier of the USSD service; and
   sending the message that requests to execute the USSD service to a subscriber data server for requesting the subscriber data server to process the USSD service;
   wherein before the application server determines that the mobile terminal supports USSD operations over IP multimedia core network subsystem, the method further comprises:
     receiving a USSD service message from the subscriber data server, wherein the USSD service message carries identification information of the mobile terminal and the identifier of the USSD service;
     determining an access network of the mobile terminal according to the identification information of the mobile terminal; and
     if the access network of the mobile terminal is the voice over Long Term Evolution network, determining whether the mobile terminal supports USSD operations over IP multimedia core network subsystem.

2. The method according to claim 1, wherein the subscriber data server comprises a home subscriber server, a home location register, or a USSD center.

3. The method according to claim 2, wherein:
   when the subscriber data server is a USSD center, receiving the USSD service message from the subscriber data server comprises:
     receiving, through a home subscriber server or a home location register, the USSD service message from the USSD center; and
   sending the message that requests to execute the USSD service to the subscriber data server comprises:
     sending, to the USSD center through the home subscriber server or the home location register, the message that requests to execute the USSD service.

4. The method according to claim 2, wherein when the subscriber data server is a home subscriber server or a home location register, before receiving the USSD service message from the subscriber data server, the method further comprises:
   receiving a first register message from the mobile terminal, wherein the first register message carries the identification information and indication information of the mobile terminal, and the indication information is used for indicating whether the mobile terminal supports USSD operations over IP multimedia core network subsystem;
   determining, according to the indication information, whether the mobile terminal supports USSD operations over IP multimedia core network subsystem;
   generating a second register message when the mobile terminal supports USSD operations over IP multimedia core network subsystem, wherein the second register message carries address information of the application server and the identification information of the mobile terminal; and
   sending the second register message to the subscriber data server.

5. A method for processing unstructured supplementary service data (USSD) service, the method comprising:
   sending, by an application server, an invite message to a mobile terminal on a voice over Long Term Evolution network when the application server determines that the mobile terminal supports USSD operations over IP multimedia core network subsystem, wherein the invite message comprises an identifier of a USSD service;
   receiving, by the application server, an invite response from the mobile terminal, wherein the invite response carries reply information entered by a subscriber and the identifier of the USSD service;
   generating, by the application server, a message that requests to execute the USSD service according to the reply information, wherein the message that requests to execute the USSD service carries the identifier of the USSD service;
   sending, by the application server, the message that requests to execute the USSD service to a subscriber data server; and
   processing, by the subscriber data server, the USSD service according to the identifier of the USSD service carried in the message that requests to execute the USSD service;
   wherein before the application server determines that the mobile terminal supports USSD operations over IP multimedia core network subsystem, the method further comprises:
     receiving, by the application server, a USSD service message from the subscriber data server, wherein the USSD service message carries identification information of the mobile terminal and the identifier of the USSD service;
     determining, by the application server, an access network of the mobile terminal according to the identification information of the mobile terminal; and
     if the access network of the mobile terminal is the voice over Long Term Evolution network, determining, by the application server, whether the mobile terminal supports USSD operations over IP multimedia core network subsystem.

6. The method according to claim 5, wherein the subscriber data server comprises a home subscriber server, a home location register, or a USSD center.

7. The method according to claim 6, wherein:
when the subscriber data server is a USSD center, receiving the USSD service message from the subscriber data server comprises:
receiving, by the application server through a home subscriber server or a home location register, the USSD service message from the USSD center; and
sending the message that requests to execute the USSD service to the subscriber data server comprises:
sending, by the application server, the message that requests to execute the USSD service to the USSD center through the home subscriber server or the home location register.

8. The method according to claim 6, wherein when the subscriber data server is a home subscriber server or a home location register, before receiving the USSD service message from the subscriber data server, the method further comprises:
receiving, by the application server, a first register message from the mobile terminal, wherein the first register message carries the identification information and indication information of the mobile terminal, and the indication information is used for indicating whether the mobile terminal supports USSD operations over IP multimedia core network subsystem;
determining, by the application server, whether the mobile terminal supports USSD operations over IP multimedia core network subsystem according to the indication information;
generating, by the application server, a second register message when the mobile terminal supports USSD operations over IP multimedia core network subsystem, wherein the second register message carries address information of the application server and the identification information of the mobile terminal;
sending, by the application, the second register message to the subscriber data server; and
recording, by the subscriber data server, a correspondence between the address information and the identification information of the mobile terminal.

9. An apparatus for processing unstructured supplementary service data (USSD) service, the apparatus comprising:
a processor and a memory coupled to the processor, wherein the processor is configured to:
send an invite message to a mobile terminal on a voice over Long Term Evolution network when it is determined that the mobile terminal supports USSD operations over IP multimedia core network subsystem, wherein the invite message comprises an identifier of a USSD service;
receive an invite response from the mobile terminal, wherein the invite response carries reply information entered by a subscriber and the identifier of the USSD service;
generate a message that requests to execute the USSD service according to the reply information, wherein the message that requests to execute the USSD service carries the identifier of the USSD service; and
send the message that requests to execute the USSD service to a subscriber data server for requesting the subscriber data server to process the USSD service;
wherein the processor is further configured to:
receive a USSD service message from the subscriber data server, wherein the USSD service message carries identification information of the mobile terminal and the identifier of the USSD service;
determine an access network of the mobile terminal according to the identification information of the mobile terminal; and
determine whether the mobile terminal supports USSD operations over IP multimedia core network subsystem if the access network of the mobile terminal is the voice over Long Term Evolution network.

10. The apparatus according to claim 9, wherein the subscriber data server comprises a home subscriber server, a home location register HLR, or a USSD center.

11. The apparatus according to claim 10, wherein when the subscriber data server is a USSD center, the processor is configured to:
receive, through a home subscriber server or a home location register, the USSD service message from the USSD center; and
send, to the USSD center through the home subscriber server or the home location register, the message that requests to execute the USSD service.

12. The apparatus according to claim 10, wherein when the subscriber data server is a home subscriber server or a home location register, the processor is further configured to:
receive a first register message from the mobile terminal, wherein the first register message carries the identification information and indication information of the mobile terminal, and the indication information is used for indicating whether the mobile terminal supports USSD operations over IP multimedia core network subsystem;
determine whether the mobile terminal supports USSD operations over IP multimedia core network subsystem according to the indication information;
generate a second register message when the mobile terminal supports USSD operations over IMS, wherein the second register message carries address information of the apparatus and the identification information of the mobile terminal; and
send the second register message to the subscriber data server.

* * * * *